United States Patent [19]

Lampert

[11] Patent Number: 5,067,783
[45] Date of Patent: Nov. 26, 1991

[54] OPTICAL FIBER CONNECTOR BUILDOUT SYSTEM

[75] Inventor: Norman R. Lampert, Norcross, Ga.

[73] Assignee: AT&T Bell Laboratories, Murray Hill, N.J.

[21] Appl. No.: 598,497

[22] Filed: Oct. 16, 1990

[51] Int. Cl.⁵ ............................................. G02B 6/36
[52] U.S. Cl. ..................................................... 385/60
[58] Field of Search .................. 350/96.2, 96.21, 96.22

[56] References Cited

U.S. PATENT DOCUMENTS

| | | | |
|---|---|---|---|
| 4,717,234 | 1/1988 | Barlow et al. | 350/96.21 |
| 4,834,486 | 5/1989 | Walker | 350/96.2 |
| 4,880,291 | 11/1989 | Aberson, Jr. et al. | 350/96.21 |
| 4,900,124 | 2/1990 | Lampert et al. | 350/96.21 |
| 4,934,785 | 6/1990 | Mathis et al. | 350/96.21 |

Primary Examiner—Frank Gonzalez
Assistant Examiner—John Ngo
Attorney, Agent, or Firm—Ed Somers

[57] ABSTRACT

A connector system (20) for interconnection of optical fiber ferrule connectors in optical wiring panels includes an array of buildout blocks (70,70) which are mounted in a panel (60). Each buildout block includes a tubular portion (76) having a keyway and provisions for receiving a buildout (100,150) which upon suitable alignment and rotation relative to the buildout block is caused to be secured to the buildout block. The buildout (100) which is adapted to receive an ST® connector includes a first tubular portion (103) in which is disposed a sleeve (107) for receiving a plug (40) of a plug assembly (22) of the connector system in one end thereof which has been inserted into the tubular portion of the buildout block with a key (43) thereof received in the keyway (78) of the tubular portion of the buildout block. Also, the sleeve is capable of having an attenuator element (140) mounted therein. In another end of the buildout, a plug (40,182) of another plug assembly is secured to a second tubular portion (102) of the buildout to allow an optical connection between fibers terminated by the plugs to be made. The plug which is secured to the second tubular portion of the buildout (150) may be that of an FC connector. Advantageously, the buildouts which represent a substantial portion of the connection need not be installed until service is required. Further, the system is such that a choice of ferrule connectors is permitted with the same buildout block. Buildouts which have attenuator elements mounted therein and those which do not are interchangeable with each other without the need for special tools.

34 Claims, 8 Drawing Sheets

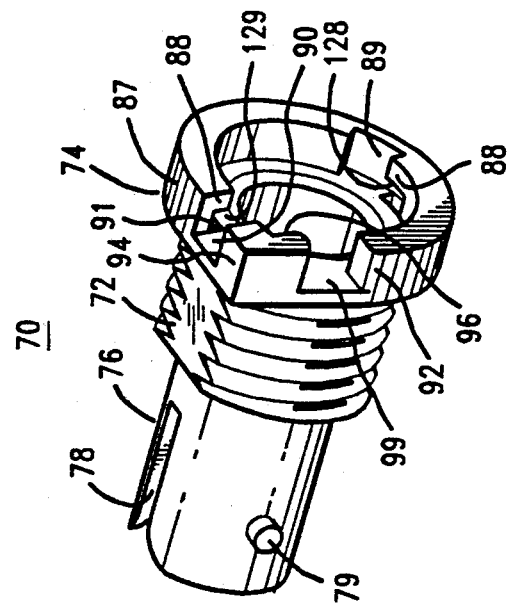
FIG. 4 70
FIG. 5 70
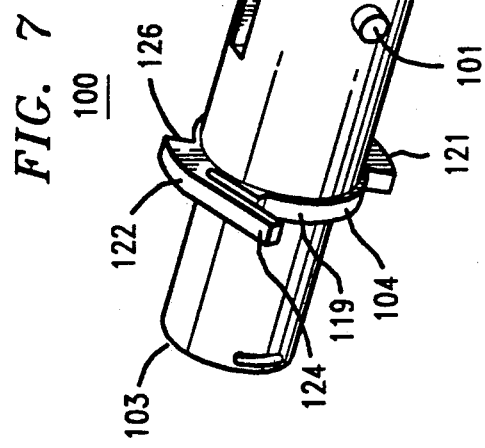
FIG. 7 100
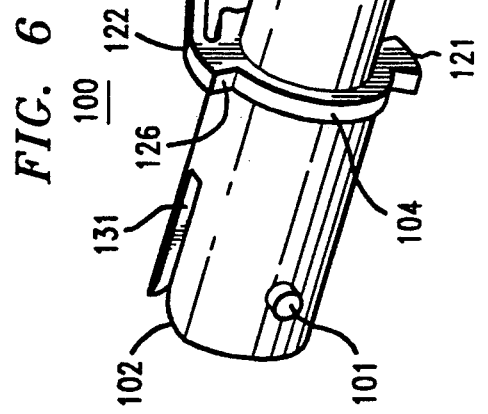
FIG. 6 100

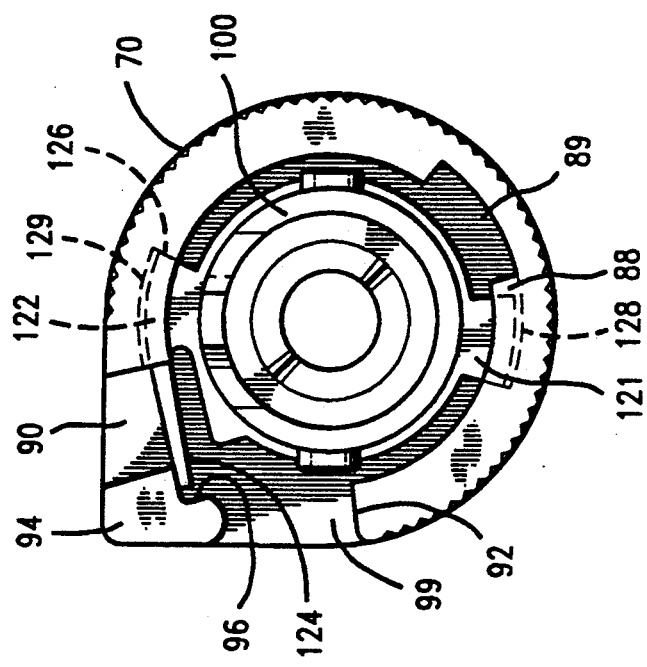
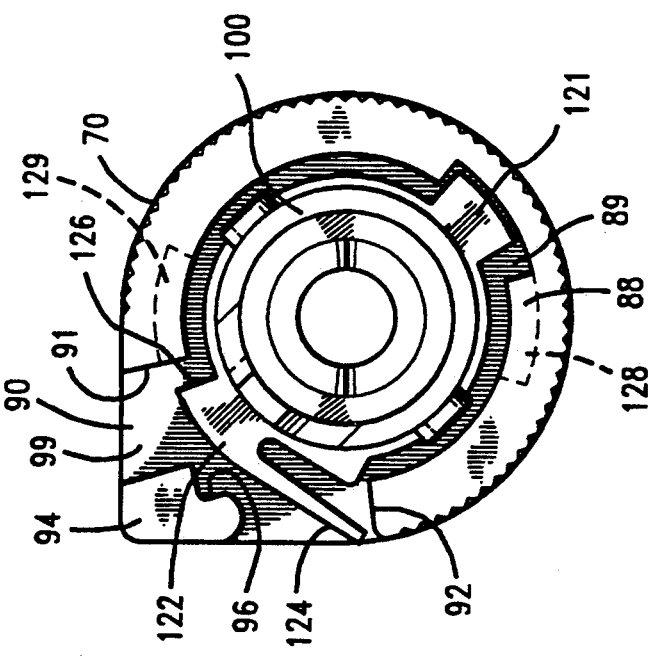

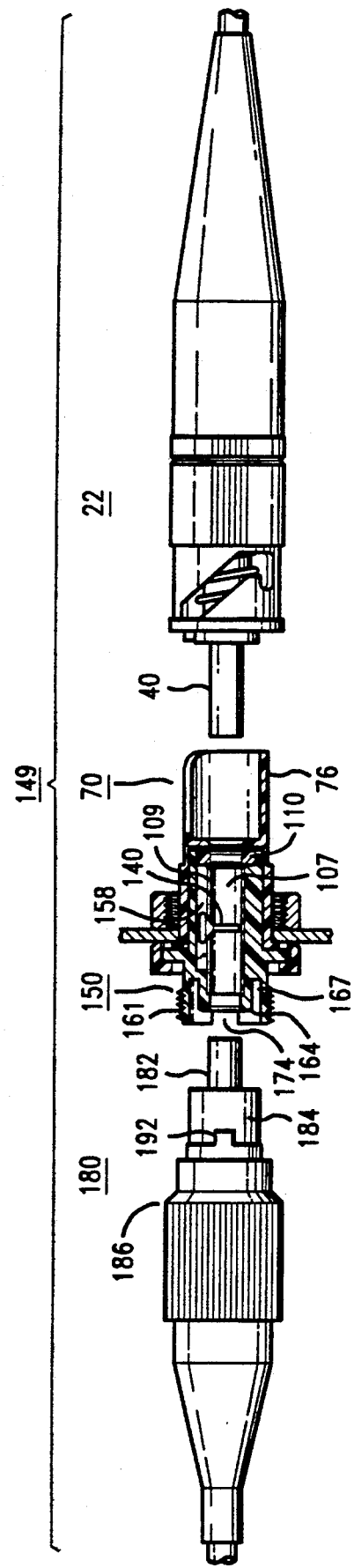
FIG. 14
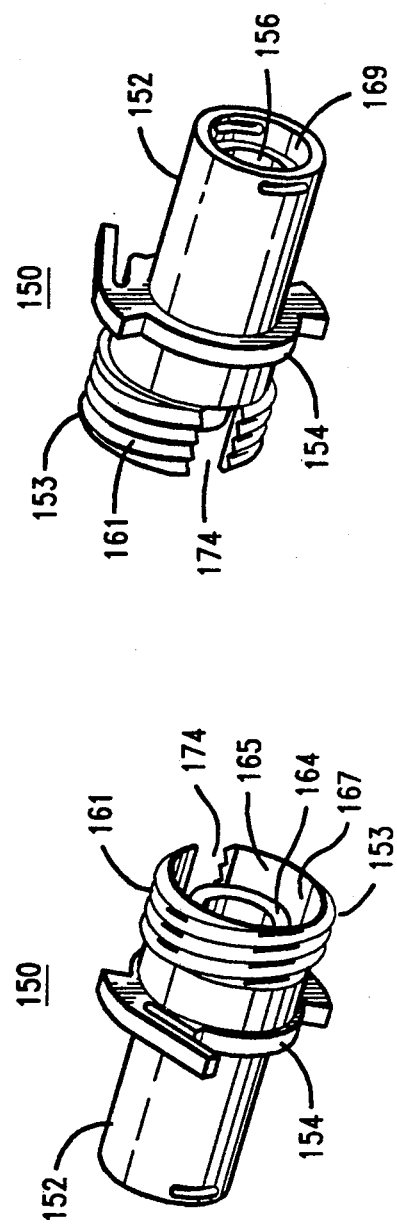
FIG. 16
FIG. 15

5,067,783

OPTICAL FIBER CONNECTOR BUILDOUT SYSTEM

TECHNICAL FIELD

This invention relates to an optical fiber connector buildout system. More particularly, the invention relates to a system of buildouts and buildout blocks which are used in optical fiber wiring panels for connectorization.

BACKGROUND OF THE INVENTION

Connectors for optical fiber transmission systems are known in the art. Often times it becomes necessary to arrange a plurality of optical fiber connectors in a panel to facilitate multifiber connections. Desirably, devices for holding connectors are mounted in the panel but the connectors themselves are not connected to incoming or outgoing fiber paths until needed to provide service. Devices which are mounted in a wiring panel to accommodate interconnections commonly are referred to as buildout blocks and buildouts.

A very much used ferrule connector for terminating and connecting two optical fibers is one which is referred to as an ST ® connector, ST being a registered trademark of AT&T. The ST connector is disclosed, for example, in U.S. Pat. No. 4,934,785 which issued on June 19, 1990 in the names of T. D. Mathis and Calvin M. Miller.

An ST connector includes a cylindrical plug or ferrule, as it is often called, having a passageway therethrough for receiving an end portion of an optical fiber to be terminated. The plug which is received in a cap is spring-loaded. When two of the plugs are received end-to-end in a coupling sleeve, for example, one or both of the plug bodies is moved along its longitudinal axis during the connection process.

There are a number of concerns which must be addressed by optical connection arrangements. It is well known to use connector adapters in panels to receive connectors. Connector adapters as well as buildout blocks may be received in panels to accommodate connectors to be installed at a future time. The capability should exist for connecting a first connector which terminates an incoming or outgoing fiber path to a buildout block to await future connection of a second connector which terminates an outgoing or incoming fiber path. It is desired to provide those kinds of arrangements with the expensive portions such as connector adapters or buildouts installed when needed for customer service.

Buildout blocks in an optical wiring panel may number in the hundreds or even thousands. With close spacing between adjacent ones in order to conserve space, it becomes difficult to perform installation, replacement or connection steps on the connector adapters or buildout blocks at the rear of panel, or for that matter, in the front of the panel.

Also, often attenuators are needed in the transmission path to reduce the strength of an incoming signal to a required level. Many optical fiber communication systems require a method of decreasing optical power at a reducing station to avoid the saturation of receivers. Such a reduction in power may be accomplished by introducing into the system a device known as an attenuator which is designed to dissipate or to attenuate a controlled fraction of the input power while allowing the balance to continue through the system. Such an attenuator is disclosed in application Ser. No. 07/566,588 filed on Aug. 13, 1990 in the names of R. R. Cammons, A. W. Carlisle and N. R. Lampert.

Changing of the attenuation level also may be required. It is known that the efficiency of a circuit decreases with age and that the power of a signal source which may be adequate at the beginning of life of a circuit later may become inadequate. If the power of the signal at the beginning is chosen so that it remains adequate later, components of the circuit may become saturated early in life. Additionally, the unearthing of cable which results in repairs that add optical loss to the transmission path can be compensated for with a lower loss attenuator. Often times, the required attenuation is introduced at an optical wiring panel or at an optical backplane where it is most convenient to insert an attenuator between connectors.

Another problem in arriving at an interconnection arrangement having the sought-after features is that during the connection process for the ST connector, as mentioned hereinbefore, movement occurs in a plug which is first inserted into a coupling sleeve when another plug is inserted into the sleeve. Any widely accepted attenuator system must be able to accommodate such movement.

Complicating matters for arranging cylindrical ferrule connections which may include attenuating provisions is the recognition that there is no universally accepted ferrule connector. AT&T's ST connector is used widely, as is a Japanese-based connector referred to as the FC connector. Desirably, a sought-after interconnection arrangement may be used to accommodate both connectors. What is needed and what does not seem to be available is a buildout interconnection arrangement which may be used in single mode-to-single mode ferrule connecting arrangements, such as for example, an ST connector-to-an ST connector or an ST connector-to-an FC connector.

What also is sought and what does not appear to be available in the prior art is a ferrule connector arrangement for wiring panels which may include an in-line buildout attenuator which results in low reflected power. Desirably, the sought after attenuator may be integrated easily and be compatible with existing ST and FC connection systems.

Further, it would be desirable to have a buildout provided with an attenuator element which may be assembled simply to a buildout block already in the wiring panel. This avoids an investment in apparatus before the time when a fiber path is put into service, yet provides an organized and relatively, inexpensive arrangement for storage of connector plugs which are mounted in buildout blocks when the buildout blocks are mounted in a panel.

Such a system of buildouts and buildout blocks for ferrule connectors desirably should be one which is capable of accommodating FC connectors as well as ST connectors. Further, the system should be one for which the decision as to which ferrule connector to use may be postponed, if necessary, until the time that service is required on a particular fiber path or paths. Also sought after is a buildout system for which manual manipulations may be performed from a front face of an optical wiring panel without special tools so that for each fiber path, a plug terminating one side of the fiber path can be connected easily to a connector already mounted in a buildout block in the panel and connected to the other side of the fiber path. Seemingly, such a buildout system is not available in prior art.

SUMMARY OF THE INVENTION

The foregoing problems of the prior art have been overcome with the connector system of this invention. An optical fiber connector system comprises two plug assemblies each of which includes a plug which terminates an optical fiber and at least one of which includes a key.

A buildout system includes a buildout block which is adapted to be mounted in an opening in a panel. The buildout block includes a tubular portion having a longitudinally extending keyway formed in a wall thereof and extending from a flanged end which includes track and latching means. Also, the buildout block includes first and second cavities which communicate with each other through an opening in an internally disposed wall with the first cavity opening to the flanged end of the buildout block and the second cavity opening to an opposite end thereof.

The system also includes a buildout which includes first and second coaxially aligned tubular portions which extend in opposite directions from a flanged portion which includes means adapted to cooperate with the track and latching means of the buildout block to secure the buildout to the buildout block upon suitable relative motion which is caused to occur between the buildout and the buildout block. The first tubular portion is adapted to be received in the first cavity of the buildout block and the second tubular portion includes means for causing one of the plugs which is inserted into the second tubular portion to become secured therewithin.

An alignment sleeve is disposed in the first tubular portion of the buildout and is adapted to receive in one end an end portion of one of the plugs which becomes disposed in the tubular portion of the buildout block. In an opposite end thereof is received the other one of the plugs which becomes disposed in the second tubular portion of the buildout to cause an optical connection to be made between the optical fibers terminated by the plugs. The sleeve includes a longitudinally extending slot in a wall thereof and the key of the at least one plug assembly is received in the keyway of the tubular portion of the buildout block when the plug of the at least one plug assembly is received in the tubular portion of the buildout block.

BRIEF DESCRIPTION OF THE DRAWING

Other features of the present invention will be more readily understood from the following detailed description of specific embodiments thereof when read in conjunction with the accompanying drawings, in which:

FIGS. 4 and 5 are perspective views of a buildout block of this invention;

FIGS. 6 and 7 are perspective views of an ST connector buildout of the buildout system of this invention;

FIGS. 8 and 9 are end views of the ST connector buildout of FIG. 7 assembled to a buildout block;

FIG. 14 is an elevational view of a buildout block adapted to receive an ST ® connector and a buildout which is capable of being assembled to the buildout block and which is adapted to receive an FC connector, the FC connector being shown rotated 180° from its assembly position with the buildout; and FIGS. 15 and 16 are perspective views of a buildout which is adapted to receive an FC connector plug.

DETAILED DESCRIPTION

Figure 1:
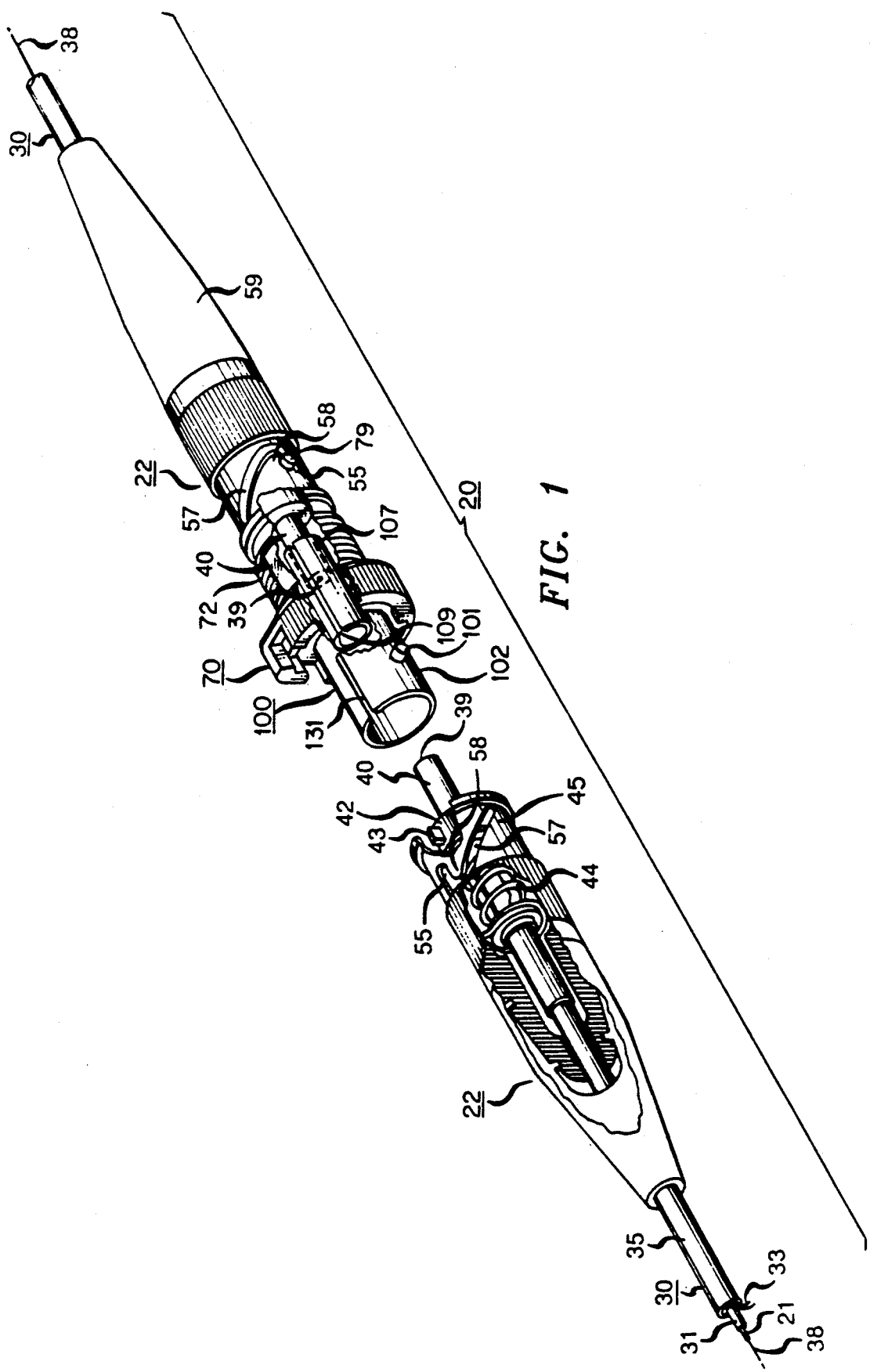
FIG. 1 is a perspective view of a buildout system of this invention with one ST connector assembled thereto and with another such connector aligned with and adapted to be assembled thereto.
Figure 2:
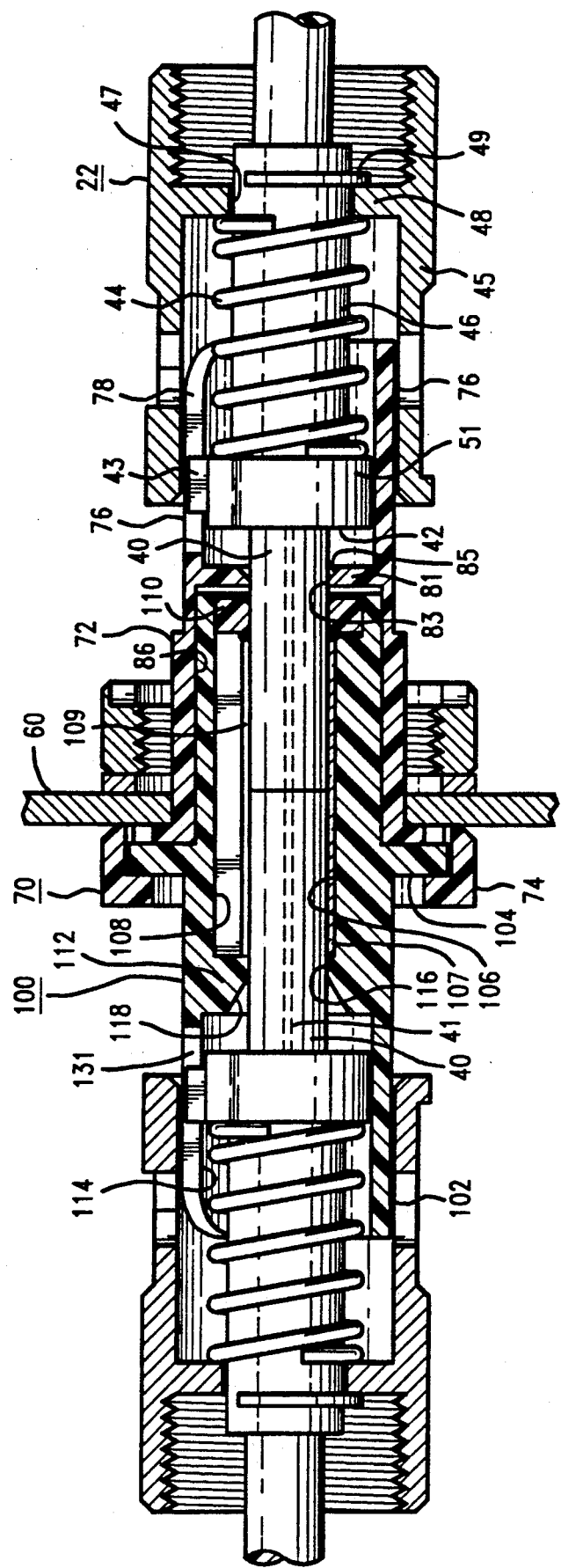
FIG. 2 is an elevational view partially in section of a buildout block and buildout of the buildout system of this invention with ST connector plug assemblies connected but not secured thereto.

Referring now to FIGS. 1 and 2 there are shown perspective and side elevational views of a connector system including a buildout arrangement or system designated generally by the numeral 20 which accommodates ferrule connectors that terminate optical fibers. One ferrule connector or plug assembly which includes AT&T's ST connector is depicted in FIG. 1 and is designated generally by the numeral 22. The plug assembly 22 is exemplary and others may include the arrangment of this invention. Each of two optical fibers 21—21 to be connected includes a glass core and cladding, enclosed in a coating system, which is well known in the art. The optical fiber may be enclosed in a tube 31 of polyvinyl chloride (PVC) to provide what is referred to as a buffered fiber which may be terminated and connected in accordance with this invention. The connective arrangement of this invention also may be used to connect single fiber cables 30—30 (see again FIG. 1) in which covering the tube 31 is a strength member 33 such as one made of aramid fibrous material, for example, and an outer jacket 35 which may be comprised of PVC.

Referring to FIGS. 1 and 2, it can be seen that the connector system 20 comprises two of the plug assemblies, each designated generally by the numeral 22. Corresponding elements of the plug assemblies 22—22 are identified with the same numerals. The plug assembly 22 is such that longitudinal axes 38—38 of the assemblies are coaxial. In addition to an end portion of an optical fiber 21, each plug assembly 22 comprises an optical fiber ferrule or plug 40, having a passageway 41 (see FIG. 2) and being made of a glass, plastic or ceramic material, for example. The plug 40 has an outer diameter of about 2.5 mm. An end face 39 of the plug 40 includes an opening of the passageway 41. It should be noted that in FIG. 2, plug assemblies 22—22 are shown assembled partially to a buildout system of this invention but are not secured thereto.

In terminating a cable 30, the optical fiber coating system, as well as the tube 31, strength member 33 and outer jacket 35, is removed from an end portion of an optical fiber 21 prior to its termination with a plug 40. Then the uncoated end portion of the optical fiber is inserted into the passageway 41 of a plug 40. The uncoated end portion of the optical fiber 21 is secured within the passageway 41 of the plug 40 and the end face of the optical fiber is cleaved and polished, for example. This process is repeated with another optical fiber and plug assembly.

Each termination also includes a connector body 42 or barrel (see FIGS. 1 and 2) made of a plastic or metallic material, a compression spring 44 and a tubular cap 45 made of a plastic or a metallic material. It should be observed that the plug 40, the connector body 42 and the cap 45 each has a cylindrical cross-section. The connector body 42 includes a separate orienting or alignment key 43 which projects radially from the longitudinal axis 38 and which can be installed at any one of a number of positions.

The connector body 42 includes a small diameter portion 46 (see FIG. 2) which extends through an opening 47 in an internally disposed collar 48 in the cap 45. A retaining washer 49 circumscribes the small diameter portion on the outer side of the collar. The spring 44 is disposed about the smaller diameter portion 46 of the connector body 42 between the collar and a large diameter portion 51. As a result of this arrangement, the spring 44 biases the connector body 42 outwardly from the cable to hold the connector body within the cap 45.

Each plug assembly also may be provided with means for limiting the allowable rotation of the cap 45 with respect to the connector body 42. In order to accomplish this, the cap may include a stud (not shown) which projects inwardly from the annular collar 48 into a camming race provided in the small diameter portion 46 of the connector body.

Viewing again FIG. 1, it can be seen that the cap 45 includes a longitudinally extending slot 55 which at one end communicates with a circumferentially extending slot 57. The slot 57 is formed so that the tubular wall of the housing which defines it includes a latching projection 58. These slots 55 and 57 and latching projection 58 are used for securing a plug assembly 22 to another portion of the connector system 20.

Completing the plug assembly 22, there is shown a cable support portion 59 (see FIG. 1) which may extend from the cap 45 along the optical fiber cable in a conically shaped configuration. This portion of the plug assembly 22 provides cable strain relief and ensures that the cable can withstand repeated bends in use after interconnection with another cable without undue stresses being imparted to the optical fibers.

Figure 3:
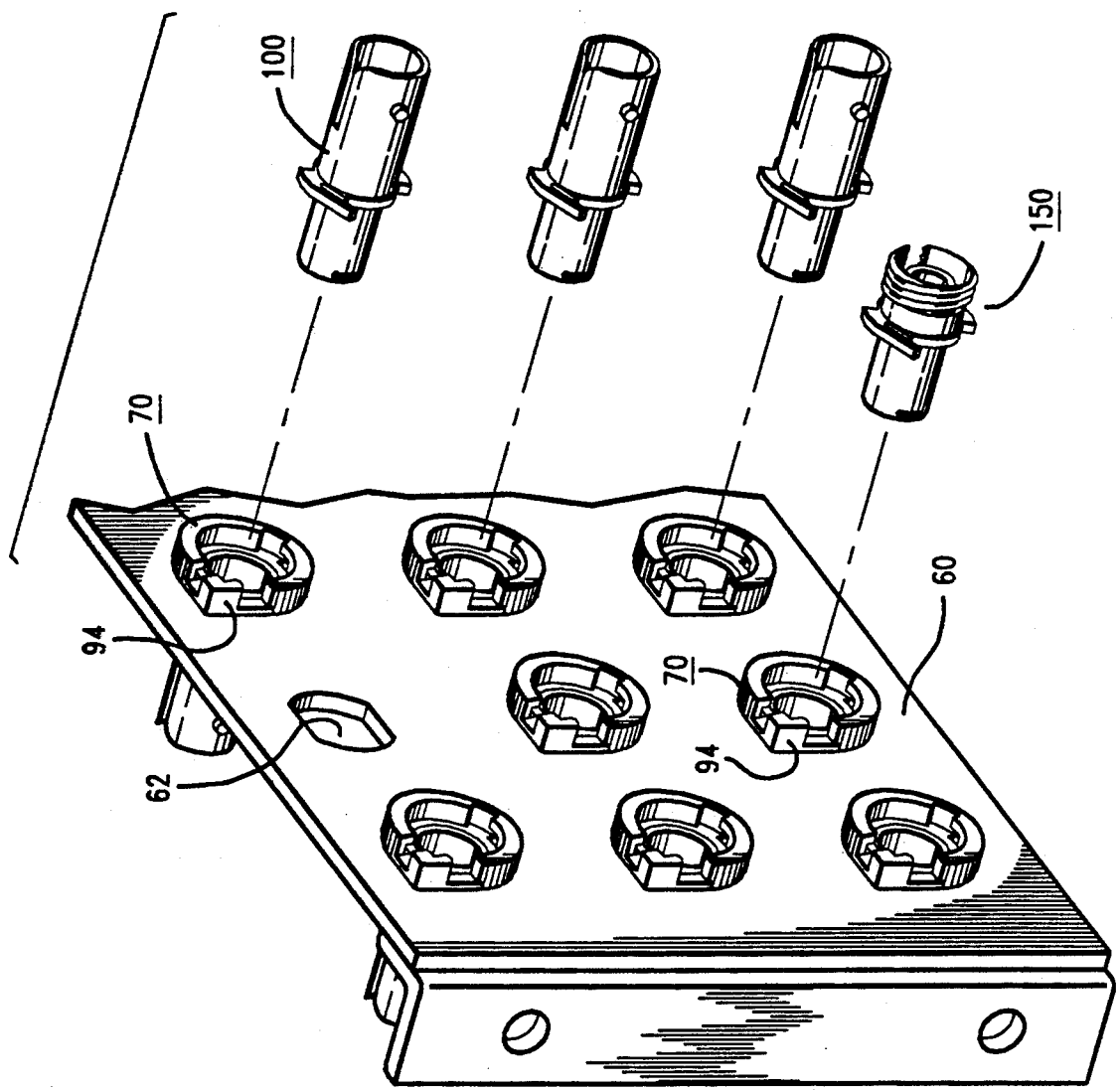
FIG. 3 is a perspective view of a patch panel in which a plurality of buildout blocks are mounted.

Optical fibers terminated with ST connectors may be interconnected in a panel arrangement. For example, viewing now FIG. 3 there is shown an optical wiring panel 60 having facilities for holding a first plurality of ST connector plugs which are connected to incoming optical fibers (not shown) and for holding a second plurality of ST or FC connector plugs, for example, which terminate outgoing fiber paths (not shown) and for holding them to cause optical fiber connections between the connectors of the first plurality and corresponding connectors of the second plurality. As can be seen, the patch panel 60 includes a plurality of openings 62—62.

In order to provide service to a multitude of customers, wiring cabinets are provided. In these cabinets, one or more panels 60—60 support connector systems which connect fiber paths extending to customers' premises or to transmission equipment. Cables which extend to the panels have their individual fibers terminated in the connectors in the panels. Then, when service to the customers is desired, a connection is made to an outgoing fiber path which may extend to transmission equipment or to customers' premises, completing the fiber path.

The facilities for holding the corresponding ST connectors in connected relationship include the buildout arrangement 20. The connection process at the panel is based on the use of what is referred to as a buildout arrangement or system. The buildout arrangement includes a plurality of buildout blocks 70—70 (see FIGS. 3-5) which are adapted to be mounted in the patch panel 60. Accordingly each buildout block 70 is adapted to extend partially through one of the openings 62—62 in the patch panel.

In simplistic terms, a mass of buildout blocks 70—70 are mounted individually in a panel in an array. As can be seen in FIGS. 4 and 5, each buildout block 70 includes a center body portion 72 having a pair of diametrically opposed flats 73—73 and threaded portions 75—75. The center body portion 72 is attached to a flanged portion 74 on one side thereof and a tubular portion 76 extending from the other side thereof. The tubular portion 76 includes a longitudinally extending keyway 78 which opens to one end thereof. Two latching pins 79—79 project radially from an outer surface of the tubular portion 76. As can be seen in FIG. 2, which depicts a side elevational view of the buildout 70, an interior wall 81 separates the tubular portion 76 from the center body portion 72. An opening 83 defined by a tapered surface 85 of the wall 81 communicates an inner portion of the tubular portion 76 with a cavity 86 of the center body portion.

Going now to FIG. 5, it can be seen that the flanged portion 74, which is knurled, includes a rim portion 87 which has overhanging portions 88—88 interrupted by cutouts 89 and 90. Ends 91 and 92 of the portion 87, are spaced apart with a retainer block 94 having a keeper 96 formed thereon. A surface plane 99 is spaced from the overhang 88 and partially covered thereby. The flanged end of the buildout block is adapted to receive and secure in place a lightguide buildout which is designated generally by the numeral 100.

One of the advantages of the buildout system of this invention is the two step process which may be used to provide mountings in a panel 60 for connectors 22—22. Initially, a mass of the relatively inexpensive buildout blocks 70—70 may be mounted in a panel 60. Then as service is needed, one or more buildouts are assembled to selected ones of the buildout blocks to facilitate interconnections of incoming and outgoing lines.

Referring now to FIGS. 6 and 7, there is shown a lightguide buildout 100 which is adapted to be received in the buildout block 70 and which is adapted to receive an ST connector. The buildout 100 includes a first tubular portion or sleeve end 103, a second tubular portion or connector plug end 102, and a flange 104. The second tubular portion 102 has a circular transverse cross section, and includes radially oppositely extending latching pins 101—101. The first tubular portion 103 includes a bore 106 which is adapted to receive a sleeve 107 (see FIG. 2) of an ST connector system. In a preferred embodiment, the sleeve is made of zirconia. For a sleeve which is adapted to be provided with attenuating means, the bore 106 opens to a longitudinally extending groove 108. (see FIGS. 1-2). The sleeve 107 is disposed in the bore 106 and has a longitudinally extending slot 109 (see again FIGS. 1-2) in the sleeve. Provisions are made at one entrance end of the first tubular portion of the buildout 100 to allow a retainer 110 (see FIG. 2) to be mounted therein. The retainer 110 which becomes disposed about a surface 111 (see FIG. 6) at an entrance to the tubular portion 103 functions to hold the sleeve 107 within the buildout inasmuch as an inner end of the first tubular portion terminates in an inner wall 112 (see FIG. 2) which separates the bore 106 from a cavity 114 of the connector plug end. The sleeve 107 is held between the wall 112 and the retainer 110. The bore 106 communicates with the cavity 114 through an opening 116 having a tapered portion 118.

As can be seen in FIG. 7, the flange 104 includes a rim portion 119, guide portions 121 and 122 and a locking portion 124. The guide portion 121, is adapted to be received in the cutout 89 and over the surface plane 99, and the guide portion 122 in the cutout 90 of the flanged end of the buildout block 70 when the buildout 100 is inserted thereinto (see FIG. 8). When the buildout 100 is rotated, the guide portions 121, 122 fit into pockets 128, 129, respectively, of the flanged end 74. With the guide portions 121, 122 received in the pockets 128, 129, a depending locking portion 124 of the guide portion 122 engages a portion of the rim portion 87 and of the retainer block 94 (see FIG. 9). The buildout is inserted so that an end 126 of the locking portion 122 is disposed beyond an end 91 of the rim portion 87 of the flanged end 74 of the buildout block 70. Viewing again FIG. 9, as the buildout is turned in a clockwise direction by a craftsperson, the leading end 126 of the guide portion 122 is caused to move beyond the cutout 90 and then between the overhang 88 and the surface plane 99 of the flanged rim 74 of the buildout block. At the same time, the guide portion 121 is caused to move beyond the cutout 89 and rides under another portion of the overhang 88 of the rim portion which terminates in the end 92. Sufficient movement of the buildout causes the end of the depending locking portion 124 to snap-lock into the keeper 96 to hold the buildout secured to the buildout block 70.

The sleeve 107 is disposed within the buildout 100 and maintained therein by the retainer 110 (see FIG. 2). The buildout includes a longitudinally extending keyway 131 whereas the buildout block includes the longitudinally extending keyway 78, with each keyway being associated with and adapted to receive a key 43 of a plug assembly 22. When the buildout 100 is secured in the buildout block 70, the longitudinally extending keyway 131 in the buildout is aligned with the longitudinally extending keyway 78 in the buildout block. Further, associated with each keyway at each end portion of the buildout block and the buildout in which the buildout is mounted are two diametrically opposed radially extending latching pins, those of the buildout block designated 79—79 associated with the keyway 78 and those of the buildout designated 101—101 associated with the keyway 131, each of which is displaced 90° from the associated keyway.

Figure 10:
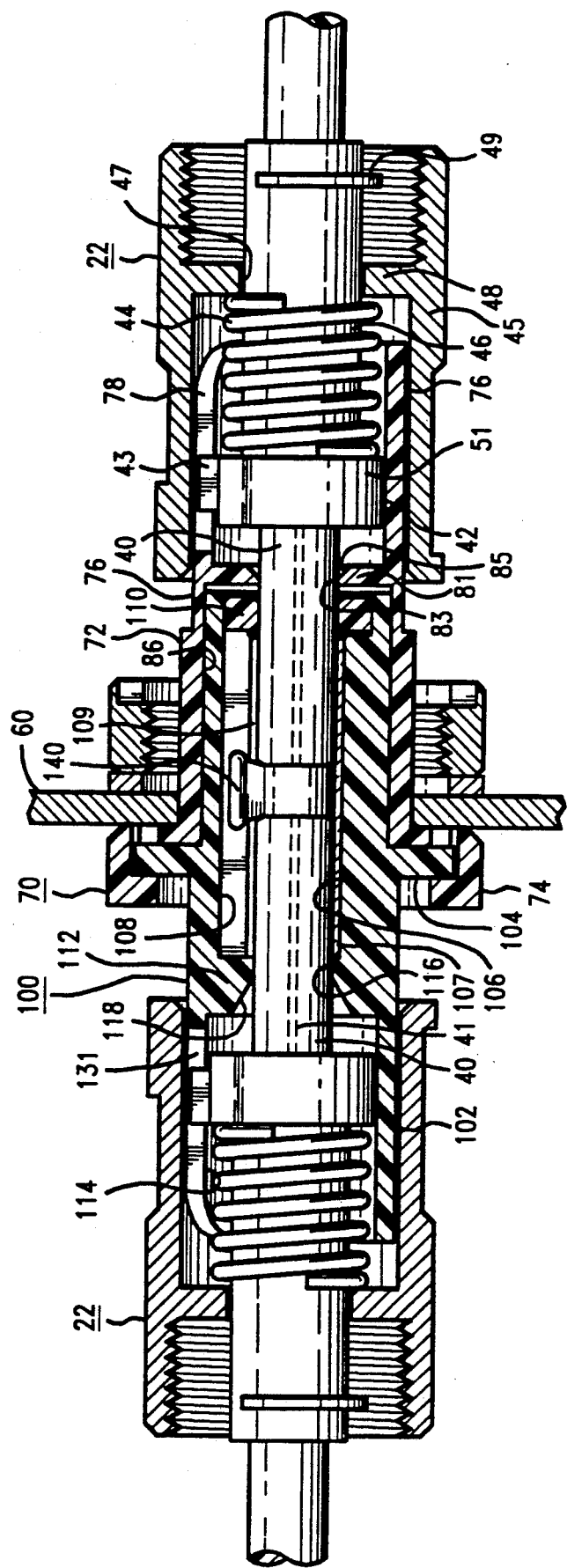
FIG. 10 is an elevational view partially in section of a buildout block and buildout of the buildout system with an attenuation element and with ST connector plug assemblies connected thereto in secured positions.

When a plug of one connector is to be inserted into the buildout block end of the sleeve 107, the alignment key 43 thereof is aligned with the keyway 78 in the buildout block. The plug 40 is inserted into the sleeve as the alignment key 43 is moved along the keyway 78 of the buildout block. At the same time, latching pins 79—79 of the buildout block enter and move along slots 57—57 and slots 55—55 of the cap 45. At the end of the travel of the plug 40, and upon turning of the cap 45 relative to the buildout block, each latching pin 79 becomes disposed behind a latching projection 58. For an outgoing fiber path, the plug 40 of the ferrule connector thereof is inserted into the buildout end of the buildout system 20 with the key 43 of that plug received in the keyway 131 of the buildout into which it is mounted. At the same time, the latching pins 101—101 of the buildout enter and move along the slots 57—57 and then the slots 55—55 of the plug assembly and, following suitable motion by the craftsperson, are caused to become disposed behind the latching projections 58—58 of the cap 45 which is received in the second tubular portion of the buildout. FIGS. 1 and 10 depict a buildout system with one or two plug assemblies 22—22, respectively, being secured to the second tubular portion of the buildout 100 and to the tubular portion of the buildout block 70. The orientation of FIG. 10 is such that it does not show the latching pins and associated slots.

Ideally, to achieve minimum loss, the plugs 40—40 disposed within the sleeve 107 should have their longitudinal axes aligned and end faces of the fibers with the end faces 39—39 contacting. To achieve the desired insertion loss for attenuation, the plugs should have their longitudinal axes aligned and end faces of the fibers with the end faces 39—39 of the plugs contacting an attenuator element 140 (see FIG. 10). It should be noted that although the connection arrangement in FIG. 10 includes an attenuator, that in FIG. 2 does not. The outer surface of each plug 40 and the inside surface of the wall of the sleeve cavity are associated conformable alignment surfaces which are intended to cause desired positioning of the plugs when the end portions of the plugs are received in the sleeve 107. When the element 140 is disposed in the alignment sleeve 107, the plugs should have a desired end separation.

Figure 13:
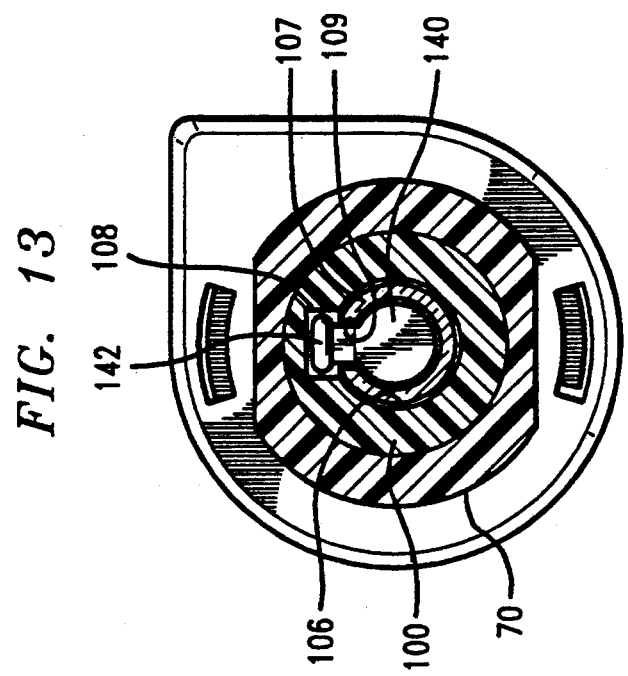
FIG. 13 is an end sectional view of the attenuator element mounted in a sleeve of a buildout which is mounted in a buildout block.
Figure 11:
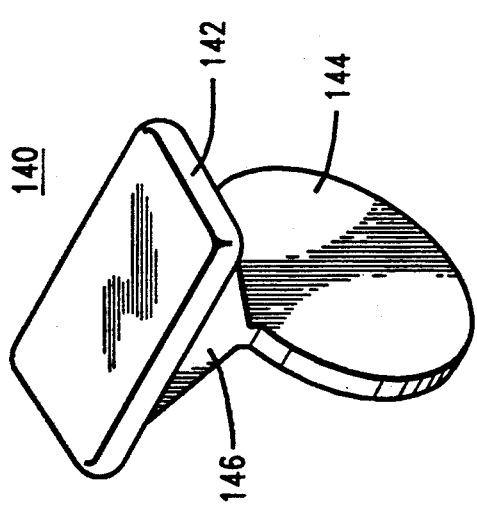
FIGS. 11 and 12 are perspective views of an attenuator element which may be mounted in a sleeve of the buildout.
Figure 12:
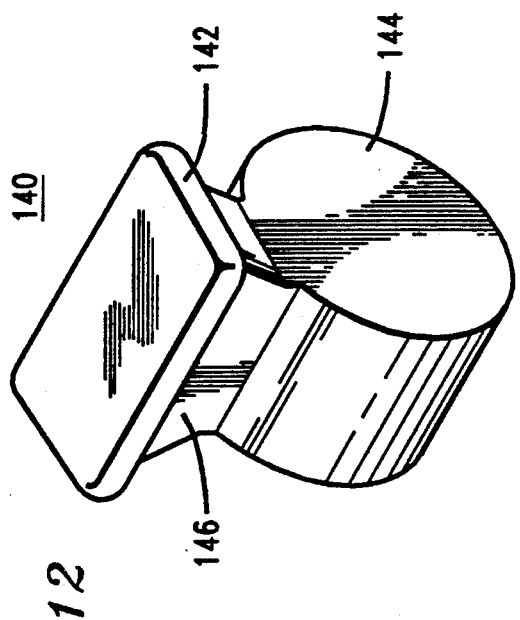

The sleeve 107 includes the longitudinally extending slot 109 which when used with an attenuator performs a dual function. Not only does the slot 109 allow the sleeve to be compliant with different plug diameters within a tolerance range, but in the case of attenuating provisions it also allows the attenuator element 140 to be moved longitudinally along the sleeve to be repositioned during insertion of the plugs 40—40. As can be seen in FIGS. 11, 12 and 13, the attenuator element 140 in side elevational view is T-shaped and includes a head 142 and a disc 144 which is engaged by each of the plugs 40—40 when the plugs are seated in the sleeve. The head 142 extends longitudinally along the slot 109 of the sleeve 107 and includes a neck 146 which is capable of being received in the sleeve slot. When the sleeve 107 is disposed in the bore 106, the longitudinally extending slot 109 (see FIG. 10) in the sleeve is aligned with the groove 108. The head 142 slides inside the groove 108 of the buildout 100 while the neck 146 cooperates to form a rail-like configuration over the slot 109 of the sleeve (see FIG. 10). On the other hand, the disc is plate-like and has a configuration in a plane normal to the longitudinal axis 38 of the connector.

As a result of the cooperation between the attenuator element 140 and the sleeve 107, the attenuator element 140 is able to be moved longitudinally within the sleeve. The ST connector is considered a floating design in which the two plugs are spring-loaded and are aligned with a compliant split sleeve located in a buildout 100 (FIG. 10). When a first plug 40 is inserted into the buildout block, the plug overtravels the transverse centerline of the sleeve 107 and its movement is arrested by the engagement at a front end of the large diameter portion 51 of the connector body with the wall 81 of the buildblock. When the second plug is joined to the other side at the buildout and contact with the attenuator element is made by the two plugs, the first plug is pushed backwards until equilibrium is reached between the spring loading of the two plugs provided by the compression springs 44—44.

Consequently, in designing an attenuator element which is placed between the fiber end-faces of the two plugs, one must either prevent the first plug from overtraveling the centerline of the sleeve or provide an arrangement for the attenuator element to travel with the plug. The latter approach is used for the attenuator element 140 by using an attenuator disc which is supported by a rail. The attenuator may be suspended with its disc-like stem in the sleeve, its neck extending through the slot in the sleeve and with its header disposed in the groove to ride therealong as the ST connector plugs are inserted.

It should be noted that the buildout system of this invention may be used also for hybrid connections of FC-to-ST connectors. Viewing now FIG. 14, there is shown an FC-to-ST connector arrangement designated by the numeral 149. Advantageously, the same buildout block 70 is used for ST connector-to-ST connector and ST connector-to-FC connector arrangements.

Viewing now FIGS. 14-16, there is shown a buildout 150 which is adapted to be received in the buildout block 70 and which is adapted to receive an FC connector plug. An ST connector plug 40 is as before capable of being received in the tubular portion 76 of the buildout block 70. The arrangement of FIG. 14 includes one portion, the right-hand portion as viewed in FIG. 14, which is similar to that of FIGS. 2 and 10. The buildout 150 includes a center flange portion 154 which is similar to the flange 104 of the buildout 100. Also, the buildout 150 includes a tubular end portion 152, a connector plug end 153 and the flange 154. The tubular end portion 152 has a circular transverse cross section. It includes a stepped bore 156 which is adapted to receive a sleeve 107. The bore 156 opens to a longitudinally extending groove 158 (see FIG. 14). When the buildout includes an attenuator element and the sleeve 107 is disposed in the bore 156, the longitudinally extending slot 109 in the sleeve is aligned with the groove 158. The buildout 150 includes an externally threaded portion 161 having a keyway 174 extending from a free end thereof and a circular boss 164 having an entry portion 165. An outer diameter of the boss 164 is less than an inner diameter of threaded portion 161 of the connector plug end 153 to provide an annular space 167.

Disposed within the buildout 150 is the sleeve 107. The slot 109 of the sleeve 107 is formed longitudinally therealong, and, when an attenuator element 140 is used, with sufficient width to allow a neck portion 146 of an attenuator element 140 to extend therethrough. The sleeve is retained within the buildout by engaging stepped inner portions of the boss 164 and with a retainer 110 held in a large diameter outer portion 169 of the stepped bore 156.

A fiber to be connected to another by an FC arrangement is terminated by a plug assembly 180 (see FIG. 14). The plug assembly 180 includes a cylindrical plug or ferrule 182 which terminates a fiber. The plug 182 is received in a connector body or barrel 184 which is received in cap 186 that is threaded internally. The cap 186 is adapted to be moved slidably over the barrel 184 and to be turned threadably over the threaded portion 161 of the FC buildout 150. The barrel and plug are biased outwardly by a spring. Also, the barrel 184 includes a key 192 which is adapted to be received in the keyway 174 of the threaded end portion 161. It should be noted that the plug assembly as shown in FIG. 14 is rotated 180° from a position for assembly with the buildout in order to depict the key 192.

When a connection is desired, a craftsperson causes the key 192 to be aligned with the keyway 174 and the plug 182 of the plug assembly to become disposed in the sleeve 157 which may contact an attenuator element 140 if one is supported in the sleeve. The barrel is moved slideably over the boss 164 while the cap 186 is turned threadably over the threaded end portion 161 of the buildout.

Insertion of either the plug of the FC connector portion or the plug of the ST connector portion causes the plug of either to engage the disc of an attenuator element 140, if used, and causes the element, which is suspended by the rail, comprising the head and the neck, to be moved in a direction along the sleeve. Insertion of the other plug engages the other major surface of the disc and causes the disc to be moved in an opposite direction until the other plug assumes its connective position. It should be observed that the overtravel of the ST connector plug 40 added to one half the length of the rail less one half the thickness of the disc of an attenuator element 140 should not extend beyond a plane designated by the numeral 190. Otherwise, the abutment of the rail at the end of the groove 158 in the cavity 156 with a portion of the buildout 150 as viewed in FIG. 14 may cause damage to the element 140 or interference with the barrel 184 of the FC plug assembly 180.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber connector system, which comprises:
   two plug assemblies each of which includes a plug which terminates an optical fiber and at least one of which includes a key;
   a buildout block which is adapted to be mounted in an opening in a panel, said buildout block including a tubular portion having a longitudinally extending keyway formed in a wall thereof and extending from a flanged end which includes track and latching means, said buildout block including first and second cavities which communicate with each other through an opening in an internally disposed wall with said first cavity opening to the flanged end of said buildout block and said second cavity opening to an opposite end of said buildout block;
   a buildout which includes first and second coaxially aligned tubular portions which extend in opposite directions from a flanged portion which includes means adapted to cooperate with said track and latching means of said buildout block to secure said buildout to said buildout block upon suitable relative motion which is caused to occur between said buildout and said buildout block, said first tubular portion adapted to be received in said first cavity of said buildout block and said second tubular portion including means for causing one of said plugs which is inserted into said second tubular portion to become secured therewithin; and
   a sleeve which is disposed in said first tubular portion of said buildout and which is adapted to receive in one end an end portion of one of said plugs which becomes disposed in said tubular portion of said buildout block and in an opposite end thereof the other one of said plugs which becomes disposed in said second tubular portion of said buildout to cause an optical connection to be made between the optical fibers terminated by said plugs, said sleeve including a longitudinally extending slot in a wall thereof and said key of said at least one plug assembly being received in said keyway of said tubular portion of said buildout block when said plug of said at least one plug assembly is received in said tubular portion of said buildout block.

2. The connector system of claim 1, wherein said buildout and said buildout block are such as to receive and cause a connection between first and second plug assemblies which are different from each other, wherein said second tubular portion of said buildout is threaded externally and is disposed concentrically about and spaced from a boss which is adapted to receive a plug of said second plug assembly and wherein said longitudinally extending keyway of said tubular portion of said buildout block is adapted receive a key which extends radially from a connector body in which said plug of said first plug assembly is mounted, said tubular portion of said buildout block including two diametrically opposed pins extending therefrom to be received in latching slots of a cap in which the connector body of said first plug assembly is mounted.

3. The optical fiber connector system of claim 1, wherein a second one of said tubular portions of said buildout includes an outer portion which is threaded externally and an inner boss which is disposed concentrically within and spaced from said outer portion and wherein the tubular portion of said buildout block includes a longitudinally extending keyway therein and two diametrically opposed latching pins projecting from an outer surface thereof, said two plug assemblies including first and second plug assemblies, said second one of said plug assemblies including a plug extending from a connector body which is adapted to become disposed about said boss of said second tubular portion of said buildout when said plug of said second plug assembly is received in said second tubular portion of said buildout and in said sleeve and further including a cap which is slideably moveable and which is internally threaded to be turned threadably over said outer portion of said second tubular portion of said buildout when said plug of said second plug assembly is received in said sleeve; and said first one of said plug assemblies including a connector body from which a plug extends, said connector body of said first plug assembly having a key projecting therefrom to be received in said keyway of said buildout block when said plug of said first plug assembly is received in said tubular portion of said buildout block and in said sleeve, said first one of said plug assemblies also including a cap which is disposed concentrically about at least a portion of said connector body and which includes two camming slots and associated latching slots so that as said plug of said first plug assembly is inserted into said sleeve and said key is received in said keyway of said buildout block, each of said pins of said buildout block is caused to be moved along a camming slot and become disposed in the latching slot associated therewith to hold said cap of said first plug assembly secured to said tubular portion of said buildout block.

4. The optical fiber connector system of claim 3, wherein said first plug assembly includes a compression spring disposed about said connector body thereof and said second plug assembly includes resilient means for biasing the plug thereof outwardly of said second plug assembly.

5. The optical fiber connector system of claim 1, which comprises a first plug assembly which includes a cylindrical plug;

a second plug assembly which includes a cylindrical plug, each plug of each said plug assembly having a passageway therethrough and being adapted to terminate an optical fiber disposed in the passageway and a cap which encloses a portion of said plug, each of said plug assemblies including means for causing said plug thereof to be biased outwardly in a direction from a fiber entrance end toward an opposite end thereof;

wherein said track means of said buildout block includes circular track means; and said buildout including tab means cooperating with said circular track means and latching means of said buildout block to secure said buildout to said buildout block upon suitable relative rotary motion which is caused to occur between said buildout and said buildout block;

said first tubular portion of said buildout adapted to be received in said first cavity of said buildout block and said second tubular portion including a longitudinal keyway which upon securement of said buildout to said buildout block is aligned longitudinally with said keyway in said tubular portion of said buildout block, the cap of said second plug assembly being adapted to be secured to an end portion of said second tubular portion of said buildout and the cap of said first plug assembly being adapted to be secured to an end portion of the tubular portion of said buildout block.

6. The connector system of claim 5, wherein said tab means of said buildout includes a tab having an end which is deflectable generally radially inwardly toward a longitudinal axis of said buildout, the tab adapted to be received between an overhang of said track means and a surface of said flanged end of said buildout block so that when said first tubular portion of said buildout is inserted into said buildout block and turned, said tab snap-locks into a secured position.

7. The connector system of claim 5, wherein said flanged portion of said buildout includes a locking tab having an end which is deflectable generally radially inwardly toward a longitudinal axis of said buildout and a guide tab, each said tab adapted to be received between an overhang of said circular track means and a surface of said flanged end of said buildout block which is spaced from said overhang as relative rotary motion is caused to occur between said buildout block and said buildout, said locking tab including a free end which is adapted to snap-lock into a secured position as a portion of each said tab is received between said overhang and said surface.

8. The connector system of claim 5, wherein each of said plug assemblies includes a cap having an annular inwardly projecting lip through which a connector body in which is disposed an end portion of the plug of said each plug assembly extends, said connector body having an enlarged end portion in which is disposed said end portion of said plug, each said plug assembly also including a retaining clip which is disposed about said connector body adjacent to an inner side of said lip and a compression spring disposed about said connector body and engaging an outer side of said lip and an inner side of said enlarged portion of said connector body to urge said connector body and plug outwardly with said retaining clip holding said plug in said cap, said connector body also including a key which projects radially from and is attached to said enlarged portion thereof;

the key of said connector body of said first plug assembly being adapted to become disposed in said keyway of said buildout block as said plug of said first plug assembly is caused to become disposed in said tubular portion of said buildout block, and said key of said connector body of said second plug assembly being adapted to become disposed in said keyway of said second tubular portion of said buildout.

9. The connector system of claim 8, wherein said tubular portion of said buildout block and said second tubular portion of said buildout each includes two diametrically opposed pins which extend radially from said buildout block and from said buildout and which are adapted to be received in latching slots which are provided in said caps in which said connector bodies are mounted to secure said plug assemblies to said buildout block and to said buildout and to prevent inadvertent rotary motion between said tubular portion of said buildout block and said cap of said first plug assembly and rotary motion between said tubular portion of said buildout and said cap of said second plug assembly which is secured thereto.

10. The connector of claim 9 wherein each said cap includes two diametrically opposed camming slots each of which extends from a free end of said cap inwardly helically about said cap, each of said camming slots communicating with an associated latching slot which extends from an inner end of the associated camming slot outwardly in a direction parallel to a longitudinal axis of said plug, each said cap also being provided with diametrically opposed entrances, each said entrance at a free end of said cap communicating with an outer end of an associated camming slot, said second tubular end portion of said buildout including a longitudinally extending keyway which extends from an entrance end of said second tubular end portion and a pair of diametrically opposed latching pins projecting outwardly from said second tubular portion, said pins and said keyway being such that when a cap of a plug assembly is aligned with said buildout such that the key of the plug thereof is aligned with said keyway in said second tubular end of said housing, said pins of the buildout are aligned with said camming slots of said cap and adapted to be moved along said entrances into said camming slots and into said latching slots to allow said plug assembly to be secured to said buildout.

11. The connector system of claim 5, wherein said tubular portion of said buildout block includes a threaded portion which is adapted to extend partially through an opening in a panel and to receive a threaded fastener to secure said buildout block to said panel.

12. The connector system of claim 5, wherein said buildout and said buildout block are such as to receive identical plug assemblies at ends thereof to facilitate a connection between said identical plug assemblies.

13. The connector system of claim 1, which also includes
an attenuating element comprising a plate-like portion being made of a material having an index of refraction substantially equal to that of glass, and a rail including a depending portion from which said plate-like portion is supported, said depending portion received in said slot of said sleeve with said plate-like portion disposed in said sleeve and with a portion of said rail disposed adjacent to an outer surface of said sleeve, said attenuating element being capable of being moved longitudinally slideably along said sleeve as each said plug is inserted into said sleeve and said element being engaged by each said plug when said plugs are seated in said sleeve.

14. The optical fiber connecting system of claim 13, which includes first and second plug assemblies and wherein said sleeve is disposed in said first tubular portion of said buildout, the second tubular portion of said buildout including an outer portion which is threaded externally and an inner boss which is disposed concentrically within and spaced from said outer portion and wherein the opposed tubular end portion of said buildout block includes a tubular portion having a longitudinally extending keyway therein and two diametrically opposed latching pins projecting from an outer surface thereof;

said second one of said plug assemblies including a plug extending from a connector body which is adapted to become disposed about said boss of said second end portion of said buildout when said plug of said second plug assembly is received in said sleeve and further including a cap which is slideably moveable and which is internally threaded to be turned threadably over said outer portion of said second tubular portion of said buildout when said plug of said second plug assembly is received in said sleeve; and said first one of said plug assemblies including a connector body from which a plug extends, said connector body of said first plug assembly having a key projecting therefrom to be received in said keyway of said tubular portion of said buildout block when said plug of said first plug assembly is received in said sleeve, said first one of said plug assemblies also including a cap which is disposed concentrically about at least a portion of said connector body and which includes two camming slots and associated latching slots so that as said plug of said first plug assembly is inserted into said sleeve and said key is received in said keyway of said buildout block, each of said pins of said buildout block is caused to be moved along a camming slot and become disposed in the latching slot associated therewith to hold said cap of said first plug assembly secured to said buildout block.

15. The connector system of claim 14, wherein said first plug assembly includes a compression spring disposed about said connector body thereof and said second plug assembly includes resilient means for biasing said first plug thereof outwardly of said second plug assembly.

16. A buildout system for connecting optical fibers terminated by plugs of first and second optical fiber plug assemblies, said buildout system including:

a buildout block which is adapted to be mounted in an opening in a panel and adapted to have a plug assembly connected thereto, said buildout block including a tubular portion having a longitudinally extending keyway formed in a wall thereof and extending from a flanged end which includes track and latching means, said buildout block including first and second cavities which communicate with each other through an opening in an internally disposed wall with said first cavity opening to the flanged end of said buildout block and said second cavity opening to an opposite end of said buildout block;

a buildout which includes first and second coaxially aligned tubular portions which extend in opposite directions from a flanged portion which includes securing means adapted to cooperate with said track and latching means of said buildout block to secure said buildout to said buildout block upon suitable relative rotary motion which is caused to occur between said buildout and said buildout block, said first tubular portion adapted to be received in said first cavity of said buildout block and said second tubular portion including securing means for causing a plug assembly which is assembled thereto to be secured against unintentional rotary motion; and a sleeve which is disposed in said first tubular portion of said buildout and which is adapted to receive in one end thereof an end portion of a plug of a plug assembly which becomes disposed in said tubular portion of said buildout block and in an opposite end thereof another plug which becomes disposed in said second tubular portion of said buildout to cause an optical connection to be made between optical fibers terminated by the plugs, said sleeve including a longitudinally extending slot in a wall thereof and said longitudinal keyway of said buildout block and said securing means of said buildout cooperating with portions of said plug assemblies assembled thereto to prevent unintended rotary motion of said plug assemblies.

17. The buildout system of claim 16, wherein said second tubular portion of said buildout includes a keyway extending longitudinally therealong.

18. The buildout system of claim 17, wherein each plug assembly includes a plug adapted to be inserted into an end of said sleeve and disposed within a connector body which is mounted within a cap, the connector body being biased outwardly from the cap, the connector body including a key, the key of the connector body in which is mounted the plug of a first plug assembly being adapted to become disposed in said keyway of said buildout block as the plug of the first plug assembly is caused to become disposed in said tubular portion of said buildout block, and the key of the connector body in which the plug of a second plug assembly is mounted being adapted to become disposed in said keyway of said second tubular portion of said buildout.

19. The buildout system of claim 18, wherein said tubular portion of said buildout block and said second tubular portion of said buildout each includes two diametrically opposed pins which extend radially from said buildout block and from said buildout and which are adapted to be received in latching slots which are provided in caps in which the connector bodies of the plug assemblies are mounted to secure the plug assemblies to said buildout block and to said buildout.

20. The buildout system of claim 16, wherein said buildout includes at one end thereof a tab having an end which is deflectable generally radially inwardly toward a longitudinal axis of said buildout, the tab adapted to be received between an overhang and a surface of said flanged end of said buildout block so that when said buildout is inserted into said buildout block and turned, said tab snap-locks into a secured position.

21. The buildout system of claim 16, wherein said flanged portion of said buildout includes a locking tab having an end which is deflectable generally radially inwardly toward a longitudinal axis of said buildout and a guide tab, each said tab adapted to be received between an overhang and a surface of said flanged end of said buildout block which is spaced from said overhang as relative rotary motion is caused to occur between said buildout block and said buildout and said locking tab including a free end which is adapted to snap-lock into a secured position as each said tab is received between said overhang and said surface.

22. The buildout system of claim 16, wherein said tubular portion of said buildout block includes a threaded portion which is adapted to extend partially through an opening in a panel and to receive a threaded fastener to secure said buildout block to said panel.

23. The buildout system of claim 16, wherein said buildout and said buildout block are such as each to receive substantially identical plug assemblies at ends thereof to facilitate a connection between said substantially identical plug assemblies.

24. The buildout system of claim 16, which also includes an attenuating element comprising a plate-like portion being made of a material having an index of refraction substantially equal to that of glass, and a rail including a depending portion from which said plate-like portion is supported, said depending portion received in said slot of said sleeve with said plate-like portion disposed in said sleeve and with a portion of said rail disposed adjacent to an outer surface of said sleeve, said attenuating element being capable of being moved longitudinally along said sleeve as each plug is inserted into said sleeve and said element being engaged by each plug when plugs are seated in said sleeve.

25. The buildout system of claim 16, which is adapted to connect optical fibers terminated by plugs of first and second plug assemblies and wherein said sleeve is disposed in said first tubular portion of said buildout, said second one of said tubular portions including an outer portion which is threaded externally and an inner boss which is disposed concentrically within and spaced from said outer portion and wherein the tubular portion of said buildout block includes two diametrically opposed latching pins projecting from an outer surface thereof, a second one of the plug assemblies including a plug extending from a connector body which is adapted to become disposed about said boss of said second tubular portion of said buildout when a plug is received in said sleeve and further including a cap which is slideably moveable and which is internally threaded to be turned threadably over said outer portion of said second tubular portion of said buildout when a plug of the second plug assembly is received in said sleeve; and a first one of said plug assemblies including a connector body from which a plug extends, the connector body of the second plug assembly having a key projecting therefrom to be received in said keyway of said tubular portion of said buildout block when the plug of the first plug assembly is received in said sleeve, the first one of said plug assemblies also including a cap which is disposed concentrically about at least a portion of the connector body and which includes two camming slots and associated latching slots so that when the plug of the first plug assembly is inserted into said sleeve and said key thereof is received in said keyway of said tubular portion of said buildout block, each of said pins of said buildout block is caused to be moved along a camming slot and become disposed in the latching slot associated therewith to hold said cap of said first plug assembly assembled to said buildout block.

26. The buildout system of claim 25 wherein the first plug assembly includes a compression spring disposed about said connector body thereof and the second plug assembly includes resilient means for biasing the plug thereof outwardly of said second plug assembly.

27. An optical fiber connection, which includes:
first and second plug assemblies each of which includes a plug having a passageway therethrough, a connector body in which said plug is mounted and a cap in which said connector body is mounted, each said plug of each said assembly terminating an optical fiber which is received in said passageway of said plug and at least one of said plug assemblies including a key;
a buildout block which is mounted in an opening in a panel, said buildout block including a tubular portion having a longitudinally extending keyway formed in a wall thereof and extending from a flanged end which includes track and latching means, said buildout block including first and second cavities which communicate with each other through an opening in an internally disposed wall with said first cavity opening to the flanged end of said buildout block and said second cavity opening to an opposite end of said buildout block;
a buildout which includes first and second coaxially aligned tubular portions which extend in opposite directions from a flanged portion which includes means cooperating with said track and latching means of said buildout block to secure said buildout to said buildout block, said first tubular portion being received in said first cavity of said buildout block and said second tubular portion including means for causing one of said plugs which is disposed in said second tubular portion to secured therewithin; and
a sleeve which is disposed in said first tubular portion of said buildout and in one end of which is received an end portion of one of said plugs which is disposed in said tubular portion of said buildout block and in an opposite end thereof is received the plug of the other one of said plug assemblies which is disposed in said second tubular portion of said buildout to cause an optical connection to be made between the optical fibers terminated by the plugs, said sleeve including a longitudinally extending slot in a wall thereof and said key of said at least one plug assembly being received in said keyway of said tubular portion of said buildout block.

28. The connection of claim 27, wherein each of said plug assemblies includes means for causing said plug thereof to be biased outwardly in a direction from a fiber entrance end toward an opposite end thereof and wherein said track means of said buildout block includes circular track means; and
said buildout including means which cooperated with said circular track and latching means of said buildout block to secure said buildout to said buildout block upon suitable relative rotary motion which was caused to occur between said buildout and said buildout block, one said cap being secured to an end portion of said second tubular portion of said buildout and the other cap being secured to an end portion of the tubular portion of said buildout block;
said first tubular portion of said buildout received in said first cavity of said buildout block and said second tubular portion of said buildout including a longitudinal keyway which is aligned longitudinally with said keyway in said tubular portion of said buildout block.

29. The connection of claim 28, wherein said flanged portion of said buildout includes a tab having an end which is deflectable generally radially inwardly toward a longitudinal axis of said buildout, said tab being received between an overhang of said circular track means and a surface of said flanged end of said buildout which is spaced from said overhang as rotary motion was caused to occur between said buildout block and said buildout, said tab including a free end which is snap-locked into a secured position as a portion of said tab was received between said overhang and said surface.

30. The connection of claim 29, wherein each of said plug assemblies includes a cap having an annular inwardly projecting lip through which a connector body in which is disposed an end portion of the plug of said plug assembly extends, said connector body having an enlarged end portion in which is disposed said end portion of said plug, each said plug assembly also including a retaining clip which is disposed about said connector body adjacent to an inner side of said lip and a compression spring disposed about said connector body and engaging an outer side of said lip and an inner side of said enlarged portion of said connector body to urge said connector body and plug outwardly with said retaining clip holding said plug in said cap, said connector body also including a key which projects radially from and is attached to said enlarged portion thereof;
the key of said connector body in which is mounted said plug of said first plug assembly being disposed in said keyway of said buildout block with said plug of said first plug assembly disposed in said tubular portion of said buildout block, and said key of said connector body in which said plug of said second plug assembly is mounted being disposed in said keyway of said second tubular portion of said buildout.

31. The connector of claim 30, wherein said tubular portion of said buildout block and said second tubular portion of said buildout each includes two diametrically opposed pins which extend radially from said buildout block and from said buildout and which are received in latching slots which are provided in said caps in which said connector bodies are mounted to secure said plug assemblies to said buildout block and to said buildout and to prevent inadvertent rotary motion between said tubular portion of said buildout block and said cap of said plug assembly secured thereto and rotary motion between said second tubular portion of said buildout and said cap assembled thereto.

32. The connection of claim 31, wherein each said cap includes two diametrically opposed camming slots each of which extends from a free end of said cap inwardly helically about said cap, each of said camming slots communicating with an associated latching slot which extends from an inner end of the associated camming slot outwardly in a direction parallel to a longitudinal axis of said plug, each said cap also being provided with diametrically opposed entrances, each said entrance at a free end of said cap communicating with an outer end of an associated camming slot, said second tubular end portion including a longitudinally extending keyway which extends from an entrance end of said second tubular end portion and a pair of diametrically opposed latching pins projecting outwardly from said second tubular portion, said pins and said keyway being such that when a cap of a plug assembly was aligned with said buildout such that the key of said plug was aligned with said keyway in said second tubular portion of said buildout, said pins of the buildout were aligned with said camming slots of said cap and were capable of being moved along said entrances into said camming slots and into said latching slots to allow said second plug assembly to be secured to said buildout.

33. The connection of claim 32, which also includes an attenuating element comprising a plate-like portion being made of a material having an index of refraction substantially equal to that of glass, and a rail including a depending portion from which said plate-like portion is supported, said depending portion received in said slot of said sleeve with said plate-like portion disposed in said sleeve and with a portion of said rail disposed adjacent to an outer surface of said sleeve, said attenuating element being moved longitudinally slideably along said sleeve as each said plug was inserted into said sleeve.

34. The connection of claim 27, wherein the second tubular portion of said buildout including an outer portion which is threaded externally and a boss which is disposed concentrically within and spaced from said outer portion and wherein the tubular portion of said buildout block includes a longitudinally extending keyway therein and two diametrically opposed latching pins projecting from an outer surface thereof, a second one of said plug assemblies including a plug extending from a connector body which is disposed about said boss of said second tubular portion of said buildout with said plug of said second plug assembly received in said sleeve and further including a cap which is slideably moveable, which is internally threaded and which is threadably engaged with said outer portion of said second tubular portion of said buildout; and a first one of said plug assemblies including a connector body from which a plug extends, said connector body of said first plug assembly having a key projecting therefrom and received in said keyway of said buildout block with said plug of said first plug assembly received in said tubular portion of said buildout block and in said sleeve, said first one of said plug assemblies also including a cap which is disposed concentrically about at least a portion of said connector body and which includes two camming slots and associated latching slots so that when said plug of said first plug assembly was inserted into said sleeve and said key was received in said keyway of said buildout block, each of said pins of said buildout block was caused to be moved along a camming slot and become disposed in the latching slot associated therewith to hold said cap of said first plug assembly assembled to said tubular portion of said buildout block.

* * * * *